Patented June 12, 1951

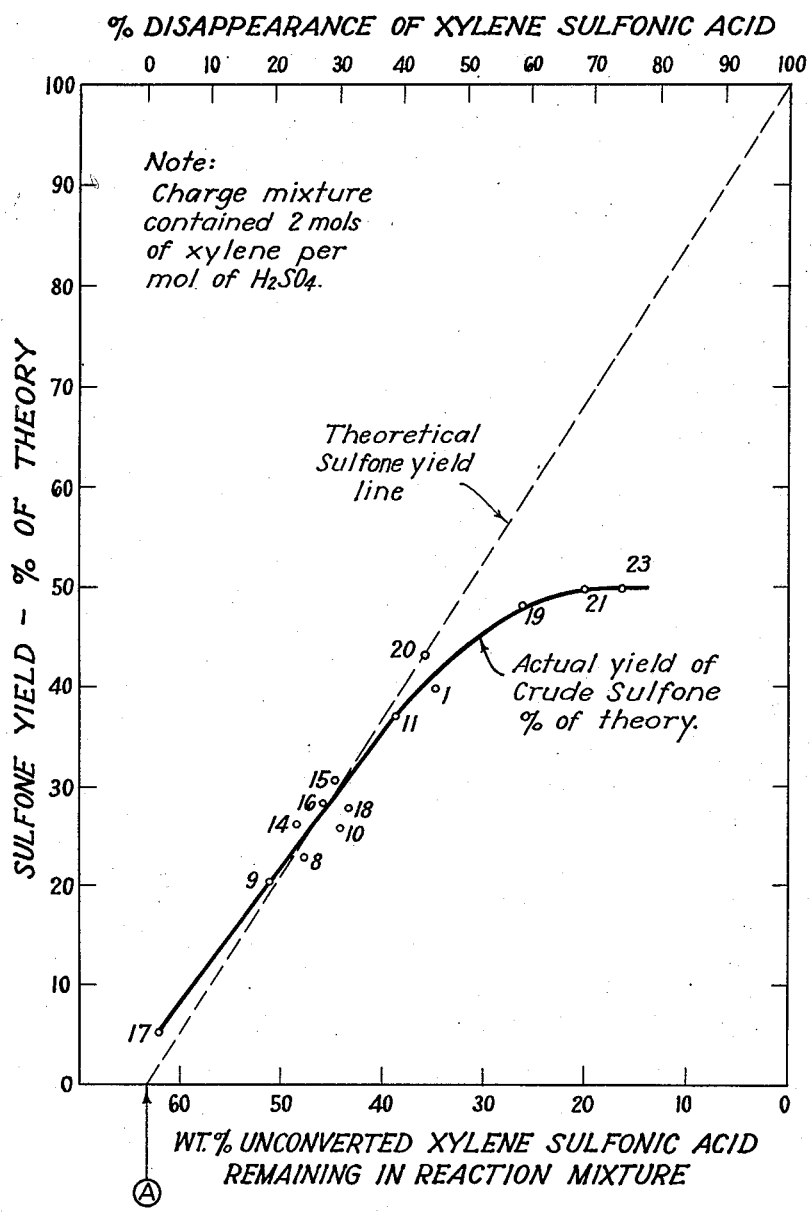

2,556,429

UNITED STATES PATENT OFFICE 2,556,429

DIARYL SULFONES AND THEIR MANUFACTURE

Robert J. Lee, La Marque, Tex., assignor to Pan American Refining Corporation, Texas City, Tex., a corporation of Delaware Application August 5, 1948, Serial No. 42,698

3 Claims. (Cl. 260—607)

This invention relates to diaryl sulfone compositions and has particular reference to compositions comprising isomeric mixtures of diaryl sulfones of the isomeric $C_8$ aromatics (ortho-, meta- and paraxylene and ethyl benzene) and to the process for their preparation. The invention specifically relates to the preparation of normally liquid mixtures of these diaryl sulfone isomers, hereinafter referred to as dixylyl sulfones, which are useful particularly as plasticizers and adhesive agents.

Diaryl sulfones have been prepared by various processes which include treatment of aryl hydrocarbons with sulfuric acid, oleum, sulfur trioxide, and aryl sulfonic acids under specified conditions of temperature, hydrogen ion concentration and the like, the oxidation of diaryl sulfides and sulfoxides, the condensation of aryl sulfonyl chloride and aryl hydrocarbons by Friedel-Crafts synthesis, and the treatment of vaporous aryl hydrocarbons with vaporous sulfur trioxide. The aforesaid treatments have provided means for obtaining several individual diaryl-sulfones and isomer mixtures thereof and all of these, as reported in the literature, have relatively high melting points, generally above 110° C., and are solid at atmospheric temperatures.

It is an object of the present invention to provide a mixture of diaryl sulfones which is liquid at atmospheric temperatures and is thereby more readily handled, and which, by virtue of its liquid state, possesses valuable properties which distinguish it from the solid diaryl sulfones heretofore available.

It is another object of the invention to provide such a normally liquid mixture of sulfone isomers having other useful physical characteristics, as, for example, high viscosity at ordinary temperatures and abnormally lower viscosity at the elevated temperatures usually employed in compounding plastic materials, thereby enhancing its usefulness as a plasticizer or other component of synthetic plastic compositions.

A further object of this invention is the provision of an improved process whereby high ultimate yields of a normally liquid mixture of diaryl sulfone isomers can be obtained from their corresponding hydrocarbons, with a minimum production of undesirable and/or insoluble by-products.

Still another object is to produce viscous, sticky, tacky diaryl sulfone products which can be incorporated in adhesive compositions and in plastic compositions, such as with Vinylite VYNW, to increase the adhesive properties of films of these plastics, to plasticize the plastic, resin or adhesive mixture and to impart other desirable properties such as improved dielectric characteristics. A further objective is to produce liquid or low melting diaryl sulfone products which have high compatibility with plastic, resin or adhesive materials and which can be mixed therewith in high concentration without crystallizing or separating therefrom at room temperature or below.

Two dixylyl sulfones of high melting point have been prepared in the past. Their melting points, 121° C. for di-m-xylyl sulfone and 197° C. for di-p-xylyl sulfone, have been reported. These melting points, and the additional fact that mixtures of para and meta-dixylyl sulfones produce a mixture that is solid at room temperature, fail to indicate that any mixture of diaryl sulfones could provide a normally liquid product at room temperature.

The present invention provides a composition comprising a mixture of diaryl sulfone isomers produced from $C_8$ aromatics which is normally liquid at room temperature, has a wide range of liquidity, and, with respect to its use as a plasticizer advantageously displays a high negative viscosity index and high compatibility with many resins and plastics. It is readily obtainable from commercially available mixtures of xylenes (normally containing 5 to 20% ethyl benzene) by an improved process whereby commercially valuable yields can be obtained. The reason for the surprisingly low melting point of the composition is not completely understood; however, it has been observed that the reaction appears to be more selective with respect to ortho-xylene although all the xylenes and ethyl benzene take part in the reaction and appear to be necessary in the feed stock in order to produce liquid or low melting sulfone products, as hereinafter discussed in connection with examples of the process.

The process of this invention comprises reacting a commercially available xylene mixture, containing ethyl benzene, with sulfuric acid at a temperature of 145° to 165° C. in a reactor equipped with suitable heating and cooling equipment and with a reflux condenser and trap for removing water from the refluxing stream. The reactor should be glass-lined or constructed of a corrosion resistant alloy, such as Monel or Inconel, as employed in other commercial sulfonation reactions. Normally the reaction vessel is charged with a mixture of xylene and 98% sulfuric acid in the ratio of two moles of xylene per mole of sulfuric acid. Initially, the reaction involves rapid sulfonation of a part of the xylene mixture to produce sulfonic acids, water being removed and trapped out of the xylene reflux stream at a relatively rapid rate. During this step, it is usually desirable to agitate the mixture since two liquid phases are present. If desired, the sulfuric acid may be added slowly while the mixture is refluxed. The sulfonation stage usually required from 4–10 hours' time. After the sulfonation is largely completed, only one liquid phase is present, and agitation is not necessary, except for preventing super-heating at the heated surface. In the experiments hereinafter described, approximately six hours were required for substantial completion of the sulfonation reaction. At this time the concentration of sulfonic acid in the reaction mixture is approximately 63 weight per cent and the amount of sulfone formed is small, usually less than 5%.

Following the sulfonation reaction, sulfone formation is the main reaction, additional water being removed from the trap as the reaction proceeds. The rate at which the reaction proceeds depends on the concentration of sulfonic acid and upon the reflux rate, high refluxing rates favoring more rapid removal of water and therefore more rapid formation of sulfones. As sulfonic acid is consumed and the concentration of sulfone increases, the reaction rate decreases so that water is removed at a decreasing rate. Moreover, since the hot refluxing xylenes contain some dissolved water which is returned to the reaction mixture, the rate may be increased toward the latter stages of the reaction by: (1) cooling the xylene reflux to approximately 100° F. before returning it to the reaction mixture, or (2) by cooling and drying the xylenes, for example, with alumina, before returning them to the reaction vessel. Drying may be advantageously employed after about 1.3 moles of water has been removed from the reaction mixture per mole of sulfuric acid charged. At this point, about 30% of the sulfonic acid has been converted to sulfone.

It is usually undesirable to convert more than about 40–45% of the sulfonic acid to sulfone in this stage of the operation. Up to this point, the actual production of sulfone is consistent with theoretical considerations, about one mole of sulfone being produced for each mole of sulfonic acid disappearance. When attempts are made to obtain higher conversions, undesirable side reactions take place with the evolution of oxides of sulfur and the formation of insoluble reaction products. In addition, extremely long reaction times are required for effecting any significant increase in yield. Due to the combination of these factors, further production of sulfone is drastically reduced to approximately one-third of the theoretical production based on disappearance of sulfonic acid. The drawing illustrates the relationship between the actual sulfone yield, the theoretical yield, and the per cent disappearance of sulfonic acid. The numbered points in this figure correspond to the runs covered in the hereinafter mentioned table of experimental data. Point A, in the drawing, corresponds to the theoretical concentration of sulfonic acid in the reaction mixture at the end of the sulfonation reaction, assuming no sulfone formation, and with a charge mixture ratio of two moles of xylene per mole of sulfuric acid.

For reasons discussed above, when approximately 40% of the sulfonic acid has been converted, predominately to sulfone, the reaction is discontinued and the sulfone and unconverted sulfonic acid are recovered from the reaction mixture. The reaction mixture is cooled and agitated with the minimum amount of water which will give a fluid aqueous phase; usually one part of water per four to five parts of crude product will give a satisfactory extraction. Care must be exercised in making this extraction and separation since the aqueous and hydrocarbon-sulfone phases are both very dark colored and are nearly indistinguishable in appearance. After mixing with water, the mixture is allowed to settle and the aqueous phase containing 50 to 65% xylene sulfonic acid is withdrawn for recharging to the reactor, with additional xylene, for the production of additional sulfone. This concentrated aqueous solution will contain some dissolved and entrained sulfone which may be recovered by washing with xylene before recharging to the reactor. In this first water extraction step, about 85–90% of the unreacted sulfonic acid is recovered. The partially extracted xylene-sulfone mixture may be given a second water extraction for recovery of practically all of the remaining sulfonic acid. A final wash with dilute caustic is then made for removal of traces of remaining sulfonic acid. Excess xylenes or other low-boiling aromatic hydrocarbons may be added prior to the washing operations to minimize emulsion formation and to facilitate phase separation. The crude neutralized sulfone is then placed in a still where the diluent xylenes are removed by distillation, aided by the use of a stripping gas or steam toward the latter stages of xylene removal. The crude sulfone, which is dark in color, is then vacuum distilled, preferably at about 240–260° C. and 10–25 mm. Hg absolute pressure, to recover a distillate product having a color of 2 to 3½ ASTM and possessing a disagreeable sulfurous odor. Approximately 85–90% of the crude sulfone is recovered as the desired distillate product. The elimination of odor from the product has oftentimes been a difficult problem. An important step in this improved process is the improvement of color and complete elimination of odor from the distilled sulfone product. This can be done by dilution of the sulfone distillate with benzene or other low boiling solvent followed by treatment with a dilute caustic solution. It is usually important that this caustic washing operation be conducted immediately after the distillation step to prevent further darkening in color of the raw distillate which sometimes occurs on standing. After stripping benzene from the sulfone, a refined odorless liquid product having a color of 1½ to 2 ASTM and a viscosity of approximately 80 stokes @ 100° F. is recovered.

If substantially more than about 40% of the sulfonic acid is converted in the sulfone process outlined above, insoluble by-products appear in the crude reaction mixture. These by-products may cause emulsion difficulties in the water washing steps. Other high boiling by-products remain dissolved in the washed sulfone and hamper the distillation operation giving rise to foaming tendencies. Moreover, due to decomposition of these by-products, the amount of distillate recovered must be reduced if excessive darkening and malodor of the distillate are to be avoided. Whereas the actual recovery of crude sulfone in the higher ranges of conversion is only about one-third of the theoretical production based on disappearance of sulfonic acid, as hereinbefore mentioned, the recovery of refined sulfone is reduced still further.

In the preferred embodiment of this invention, the concentrated aqueous sulfonic acid solution recovered from the water-extraction step of a previous operation is charged to the original reaction vessel together with additional xylene (2 moles per mole of sulfuric and sulfonic acid charged) and an amount of sulfuric acid equivalent to the xylene sulfonic acid previously converted. This mixture is then refluxed to remove water as hereinbefore described to convert the sulfuric acid to xylene sulfonic acid and simultaneously to dehydrate the concentrated aqueous sulfonic acid solution introduced as part of the charge. The xylene sulfonic acid is converted to sulfone by reaction with the xylene present. The reaction is allowed to proceed until less than 50%, and preferably about 40% of the sulfonic acid is converted to sulfone. The crude sulfone and unreacted sulfonic acid are then recovered and the sulfone is refined as described above. In this manner, a maximum ultimate yield of refined sulfone is produced from the raw materials and the xylene sulfonic acid is converted almost completely to the desired sulfone product.

In the preceding discussion of the preferred embodiment of this invention it was pointed out that the employment of high xylene reflux rates is an important factor in increasing the rate of conversion of xylene sulfonic acid to sulfone. Since the sulfone producing reaction is an equilibrium reaction, it is desirable that the water product be removed from the reaction zone as completely and rapidly as possible. High xylene reflux rates in conjunction with a water-trap in the condenser system enable this to be done and will shorten substantially the time required to obtain the desired 40–45% conversion of sulfonic acid to sulfone. For example, as illustrated by the data in Table I, the use of xylene reflux rates of 1.1–1.6 pounds of xylene reflux per hour per pound of xylene charged to the reaction will provide a sulfone yield in 15–20 hours comparable to that obtained after 40–55 hours when lower reflux ratios of the order of 0.25 pound of xylene reflux per hour per pound of xylene charge are employed. In fact at the latter low reflux ratio, it is practically impossible to obtain the desired 40–45% conversion of sulfonic acid to sulfone even at extremely long reaction times. It is therefore desirable and important to employ xylene reflux rates in excess of about one pound per hour per pound of xylene charged. The use of higher xylene reflux ratios, within the range of 1.5–2.0 pounds per hour per pound of xylene charged, effects the conversion of 40–45% of the sulfonic acid to the novel mixture of dixylyl sulfone isomers in 30–40 hours, total reaction time. This important factor does not appear to have been recognized previously and is a significant element of the improved process described herein. Moreover, the importance of this factor is not limited to the preparation of dixylyl sulfone but is applicable to other sulfone producing reactions between other aryl sulfonic acids and other aromatic hydrocarbons or mixtures.

In Table I, results are tabulated for a number of runs for producing diaryl sulfones under various reaction conditions from $C_8$ aromatic hydrocarbon mixtures. This xylene feed stocks used for these runs had the following compositions.

|  | Feed Stock A, Runs 20, 21 and 23 | Feed Stock B, Runs 9, 10, 11, 14, 15, 16, 17, 18, 19 | C Run #8 | D Run #1 |
|---|---|---|---|---|
| para-xylene | 23.8 | 25.8 | 24.8 | 15.5 |
| meta-xylene | 50.4 | 50.2 | 71.3 | 39.6 |
| ortho-xylene | 11.5 | 5.9 | 0.0 | 16.4 |
| ethyl benzene | 8.4 | 13.9 | 3.3 | 20.0 |
| non-aromatics | 5.9 | 5.2 | 1.6 | 8.5 |
|  | 100.0 | 100.0 | 100.0 | 100.0 |

The refined sulfone product produced in all the above runs, except Run #8, was a viscous oil whereas the sulfone product from Run #8 was a crystalline solid having a melting point of approximately 77° C.

Another feed stock (E) containing 15.5% para-xylene, 39.6% meta-xylene, 16.4% ortho-xylene and 20% ethyl benzene has also been successfully employed by me for producing a liquid diaryl sulfone mixture by the improved process described herein. In this case the ortho-xylene and ethyl benzene accounted for 23 and 25% respectively of the total aromatics entering into the product while para-xylene and meta-xylene accounted for 14 and 38% respectively. Additional data on the other feed stocks are presented in Table II hereinafter.

The variable studied and reported upon in Table I, following, include the effect of time and temperature of reaction, refluxing rates, the use of excess xylenes, the use of a drying agent to remove water from the reflux stream and the relationship between the actual and theoretical sulfone yields for a given conversion of xylene sulfonic acid.

*Table I*

| Charge | | Reaction | | Reflux Rate, lb./hr./lb. Xylene Chg. | Water Recovered, Moles $H_2O$ Per Mole $H_2SO_4$ | Xylene Reacting, Grams | Xylene Sulfonic Acid (XSA) in Reaction Mixture | | Crude Sulfone, Grams | Weight Per Cent Sulfone Yield Based on— | | | |
|---|---|---|---|---|---|---|---|---|---|---|---|---|---|
| Gms. Xylene | Grams, 100% $H_2SO_4$ | Time, Hrs. | Temp., °C. | | | | Weight Per Cent | Grams | | Total Charge | Xylenes Reacting | $H_2SO_4$ Charge | Per Cent of Theory |
| RUN NO. 19.—Refluxing temperature allowed to rise during run. No excess xylene was added during the run. | | | | | | | | | | | | | |
| 4,770 | 2,174 | 4 | 148 | 1.1–1.6 | 1.630 | 3,522 | ---- | ---- | ---- | ---- | ---- | ---- | ---- |
| ---- | ---- | 21.5 | 159 | ---- | ---- | ---- | 36.35 | ---- | ---- | ---- | ---- | ---- | ---- |
| ---- | ---- | 42 | 165 | ---- | ---- | ---- | ---- | ---- | ---- | ---- | ---- | ---- | ---- |
| ---- | ---- | 49 | 174 | ---- | ---- | ---- | 26.15 | 1,700 | 2,985 | 42.8 | 84.7 | 135.2 | 48.4 |
| RUN NO. 20.—Excess xylene (1338 grams) was added during the run to hold the reflux temp. at 155° C. or less. | | | | | | | | | | | | | |
| 4,770 1,338 (XS) 6,108 | 2,175 | 71.5 | 155 (max.) | 1.1–1.6 | 1.507 | 3,267 | 35.8 | 2,228 | 2,681 | 32.3 | 82.2 | 121.5 | 43.4 |

Table I—Continued

| Charge | | Reaction | | Reflux Rate, lb./hr./lb. Xylene Chg. | Water Recovered, Moles H₂O Per Mole H₂SO₄ | Xylene Reacting, Grams | Xylene Sulfonic Acid (XSA) in Reaction Mixture | | Crude Sulfone, Grams | Weight Per Cent Sulfone Yield Based on— | | | |
|---|---|---|---|---|---|---|---|---|---|---|---|---|---|
| Gms. Xylene | Grams, 100% H₂SO₄ | Time, Hrs. | Temp., °C. | | | | Weight Per Cent | Grams | | Total Charge | Xylenes Reacting | H₂SO₄ Charge | Per Cent of Theory |
| RUN NO. 21.—A drying agent (alumina) was used to dry the reflux stream after 16 hours operation. Extra xylene was added to make up for xylene lost when changing drying tubes at 7 hr. intervals. |||||||||||||||
| 4,770 | 2,175 | 63 | 160–165 | 0.2–0.6 | ......... | 3,170 | 20.1 | 1,307 | 3,142 | 44.8 | .... | 139.5 | 49.8 |
| RUN NO. 23.—Water was trapped out of refluxing xylene stream during first 21½ hours at which point 554 grams of water had been separated; thereafter dry xylene was continuously charged and distilled through the reaction mixture for 60 more hours to remove all water completely. |||||||||||||||
| 4,770 | 2,175 | 81½ | 155–165 | 0.5–0.6 | 705 (Est.) | ..... | 16.2 | 992 | 3,070 | 44.3 | .... | 139.8 | 49.9 |
| RUN NO. 18.—Smaller charge employed compared to runs 8, 9, 10, 15, 16 and 17 in order to obtain a higher refluxing rate per unit volume of charge. |||||||||||||||
| 4,770 | 2,175 | 16.5 | ..... | 1.3–1.8 | 1.391 | 2,629 | 43.35 | 2,735 | 1,640 | 23.3 | 62.4 | 75.5 | 28.0 |
| RUN NO. 17.—A short 6 hr. run was made to determine the extent of sulfone formation during the sulfonation stage of the reaction; the reaction mixture was homogeneous after 6 hours indicating that H₂SO₄ has probably reacted completely. |||||||||||||||
| 9,540 | 4,350 | 6 | ..... | 1.1–1.6 | 1.020 | 5,143 | 62.2 | 8,100 | 613 | 4.4 | 11.9 | 14.1 | 5.03 |
| RUN NO. 16.—Excess xylene (1700 gms.) added after 8 hours to maintain a good reflux rate and to determine if excess xylene would increase yields; the final sulfonic acid content was corrected to eliminate the effect of excess xylene. |||||||||||||||
| 9,540 | 4,350 | 28 | 151 (max.) | 0.8–1.1 | 1.341 | 6,640 | 45.9 | 5,900 | 3,452 | 36.3 | 52.0 | 79.4 | 28.3 |
| RUN NO. 15.—Straight run (21 hrs.) at moderately high reflux rate and with no excess xylene added; compare with run #16 in which excess xylene was added and in which a lower sulfone yield was obtained even though the reaction time was longer. |||||||||||||||
| 9,540 | 4,350 | 21 | 155 (max.) | 0.4–0.9 | 1.34 | 6,295 | 44.7 | 5,620 | 3,740 | .... | 59.4 | 85.9 | 30.7 |
| RUN NO. 14.—Moderately high reflux rate was employed with a larger charge and shorter time to produce additional product for evaluation purposes. |||||||||||||||
| 9,540 | 4,350 | 15.5 | ..... | 0.6–1.1 | 1.267 | 6,323 | 48.46 | 6,080 | 3,199 | 23.1 | 50.6 | 73.6 | 26.3 |
| RUN NO. 11.—¾ charge of run #10; higher reflux rate per unit volume of reactants was employed. |||||||||||||||
| 9,540 | 4,350 | 42.5 | ..... | 0.32–0.52 | 1.409 | (6,270) | 38.7 | 4,880 | 4,506 | 32.5 | 71.9 | 103.7 | 37.1 |
| RUN NO. 10.—Maximum charge for 22-liter pot. Reflux rate per unit volume of charge was relatively low in this case. As a result, the removal of water of reaction was slow and a low yield was obtained even tho a long reaction time was employed. The run was continuous for 52 hours, whereas in other runs operation was usually in 8 hour stretches. |||||||||||||||
| 12,720 | 5,804 | 52 | ..... | (0.15–0.25) | 1.309 | (7,260) low | 44.1 | 7,480 | 4,184 | 22.6 | 57.6 | 72.1 | 25.8 |
| RUN NO. 9.—3° xylene charge stock. The amount charged was the maximum practical charge for a 22-liter pot; hence the low reflux rate. |||||||||||||||
| 12,720 | 5,804 | 32.5 | ..... | (0.15–0.25) | 1.22 | 7,565 | 51.15 | 8,760 | 3,309 | 17.8 | 43.7 | 57.0 | 20.35 |
| RUN NO. 8.—Baker's 1° C. P. xylene used as charge stock instead of 3° xylene. The sulfone product was a solid of 76° C. crystallizing point. |||||||||||||||
| 12,720 | 5,804 | 26.25 | ..... | (0.13–0.25) | 1.22 | 5,100 | 47.84 | 8,160 | 3,698 | 19.85 | 48.5 | 63.7 | 22.75 |
| RUN NO. 1 |||||||||||||||
| 2,120 | 940 (96%) | 45 | ..... | ......... | 1.47 | (1,530) | 34.6 | 1,269 | 1,044 | 32.2 | 63 | 111 | 39.7 |

For some of these runs, the unconverted xylene, recovered from the reaction mixture, was analyzed by ultraviolet spectroscopy to determine the extent to which the various xylenes (and ethyl benzene) entered into the reactions. The following Table II shows the results of the analyses of the unconverted xylenes compared with the feed together with figures showing the distribution of the three xylene isomers and ethyl benzene in the converted products and also data showing the percentage conversion of these four C₈ aromatics.

Table II

| | Composition of Xylene | | Per Cent of Isomer Reacting | Distribution of Converted Isomers in Products, Per Cent |
|---|---|---|---|---|
| | Charge | Unconverted | | |
| *Run #20* | | | | |
| p-xylene | 23.8 | 30.2 | 41 | 19 |
| m-xylene | 50.4 | 49.0 | 55 | 53.5 |
| o-xylene | 11.5 | 2.5 | 90 | 20 |
| ethyl benzene | 8.4 | 9.8 | 46 | 7.5 |
| *Run #19* | | | | |
| p- | 25.8 | 33.9 | 66 | 23 |
| m- | 50.2 | 42.1 | 78 | 54 |
| o- | 5.9 | 0.5 | 97 | 8 |
| ethyl benzene | 13.9 | 11.5 | 78 | 15 |
| *Run #8* | | | | |
| p- | 24.8 | 31.8 | 49 | 20 |
| m- | 71.3 | 61.5 | 65 | 78 |
| o- | 0.0 | 0.0 | | |
| ethyl benzene | 3.3 | 5.3 | 36 | 2 |

As stated above, the sulfone product from Run #8 was a solid of approximately 77° C. melting point. It will be noted from the above tables that the feed stock used in this run was deficient in ortho-xylene and ethyl benzene. Although the exact proportions of these isomers required to assure the formation of a liquid sulfone product are unknown, it is believed that the concentration of ortho-xylene and/or ethyl benzene in the feed must be in excess of 5% in order to produce a liquid sulfone. Since most commercially available xylene mixtures contain in excess of 15% of ortho-xylene plus ethyl benzene, they are generally adaptable to the production of liquid diaryl sulfones.

The physical and chemical properties of a sample of dixylyl sulfone produced from xylene feed stock B of Table II are shown in Table III.

*Table III*

Boiling range, 240–250° C. @ 10 mm. Hg
Flash point (C. O. C.), 420
Pour point (80° F.)
Specific gravity (25/25° C.), 1.16
Refr. index ($n_D^{25}$), 1.5882
Specific dispersion ($n_F, n_C$ @ 25° C.), 174
Color (NPA or ASTM), 2 (light yellow)
Color (Gardner), 7–8
Odor, odorless
Molecular weight:
    Determined (Menzies-Wright), 281
    Theory, 274
Percent sulfur:
    Determined, 11.38
    Theory, 11.68
Viscosity:
    Gardner @ 77° F., Z—10++
    Absolute viscosity @ 77° F., 1260 stokes
    Absolute viscosity @ 100° F., 80 stokes
    Saybolt seconds, universal, at—
        100° F., (39,960) (8000 centistokes)
        140° F., 1380 (289 centistokes)
        210° F., 82 (17.6 centistokes)

Data on molecular weight and per cent sulfur for this sample are included in the table, good agreement between the theoretical and actual values being obtained. This viscosity data at 77° F. and 100° F. were determined using a Gardner viscometer. The absolute viscosity at 77° F. was found to be 1260 stokes (equivalent to 582,000 Saybolt Seconds, Universal) and at 100° F. the viscosity was 80 stokes (36,960 SSU) compared with 0.176 stoke or 82 SSU at 210° F. These data show the extreme and unusual effect of temperature upon the viscosity of this product as further indicated by the fact that the ASTM viscosity-temperature slope is 1.263 for the sample described.

The sulfone product produced from the preferred feed stocks described above is a viscous liquid which maintains its fluid character at room temperatures (75–90° F.) for extended periods of time. In some cases, depending on storage conditions, total mass of sample, container surface, etc., crystal growth may occur slowly. The fluid super-cooled condition may be restored by heating the sample to 75–100° C. and cooling, whereafter the product will retain its fluid condition for several days to several weeks or longer.

The process described above, in its preferred embodiment, may be applied advantageously for the production of other mixed diaryl sulfones in high ultimate yield. For example xylyl-tolyl-sulfone has been prepared in this manner from an equimolecular mixture of commercial xylene and technical grade anhydrous toluene sulfonic acid. The mixed xylyl-tolyl sulfone is a viscous oil at room temperature but has a tendency to crystallize not exhibited by the mixture of dixylyl sulfone isomers described above. The following table reports some of the properties of the mixed xylyl-tolyl sulfone:

Boiling range at—
    760 mm., 743–788° F.
    100 mm., 590–608° F.
    10 mm., 464–482° F.
Viscosity in Seconds, Saybolt Universal, at—
    100° F., 10,050
    125° F., 1338
    150° F., 333
    210° F., 62.7
Viscosity index, —2220
Refractive index, $N_D$ at 25° C., 1.58828
Density at 25° C., 1.169
Bromine No., 0.0
Color, NPA (light yellow), 1½
Weight percent sulfur (found), 11.6
Weight percent sulfur (theory), 12.3

In addition to its stated uses as a plasticizer and adhesive agent, the mixture comprising dixylyl sulfone isomers exhibits good thermal stability and consequently is useful as a heat transfer medium. In one example, the said isomer mixture was employed as a heating medium in a bath operating at 660° F. for a considerable period of time without observed decomposition.

In the claims, where reference is made to dixylyl sulfone it will be understood that this term is intended to include the mixed sulfones produced from a feed stock containing the isomeric $C_8$ aromatics, and therefore includes ethyl benzene in addition to the three isomeric xylenes. Similarly, the term "sulfuric acid" as used in the claims is intended to include sulfonizing agents affording sulfuric acid or its equivalent under reaction conditions.

Specific embodiments of my invention having been described in the preceding specific examples, what I claim is:

1. A process of preparing a normally liquid mixture of dixylyl sulfone isomers comprising heating a mixture of $C_8$ aromatic hydrocarbons containing 35 to 50% metaxylene, 10 to 26% paraxylene, 5 to 25% orthoxylene and about 5 to 15% ethylbenzene in the presence of sulfuric acid to effect reaction therebetween and convert $C_8$ aromatic hydrocarbons to the corresponding aryl sulfonic acids, heating the so-produced reaction mixture at a temperature between 145° and 165° C., refluxing C8 aromatic hydrocarbons from the reaction zone during the reaction period, separating water from the refluxing condensate before its return to the reaction zone, continuing reaction between so-formed aryl sulfonic acids and sulfuric acid until more than 20% but less than 45% of the so-formed aryl sulfonic acids are converted to a normally liquid mixture of dixylyl sulfones, as produced by the said reactions between said mixture of C8 aromatic hydrocarbons and sulfuric acid, and recovering the said normally liquid mixture of dixylyl sulfones from the reaction mass.

2. The process of claim 1 in which the said C8 aromatic hydrocarbons are refluxed from the reaction zone at the rate of 1.0 to 2.0 pounds of reflux condensate per hour per pound of C8 aromatics charged.

3. The normally liquid mixture of dixylyl sulfone isomers that is produced by reaction between sulfuric acid and a mixture of C8 aromatic hydrocarbons consisting essentially of 35 to 50 per cent metaxylene, 10 to 26 per cent paraxylene, 5 to 25 per cent orthoxylene and about 5 to 15 per cent ethylbenzene, while refluxing the admixture of acid and aromatic hydrocarbons at a refluxing temperature, separating water from the reflux condensate before returning the condensate to the reaction mixture, continuing the refluxing and water removal until most of the aromatics are converted into aryl sulfonic acids and at least 20 per cent of the aryl sulfonic acids are converted into sulfones, and recovering said sulfones from the reaction mixture to obtain the normally liquid mixture of dixylyl sulfone isomers.

ROBERT J. LEE.

REFERENCES CITED

The following references are of record in the file of this patent:

UNITED STATES PATENTS

| Number | Name | Date |
|---|---|---|
| 2,069,774 | Reid | Feb. 9, 1937 |
| 2,257,969 | Loane et al. | Oct. 7, 1941 |

FOREIGN PATENTS

| Number | Country | Date |
|---|---|---|
| 701,954 | Germany | Jan. 27, 1941 |

OTHER REFERENCES

Pollak et al.: Monat. fur Chemie, vol. 55, pages 358–378 (1930).